US 6,687,496 B1

(12) United States Patent
Nangle

(10) Patent No.: US 6,687,496 B1
(45) Date of Patent: Feb. 3, 2004

(54) MEMORY PROGRAMMING METHOD AND SYSTEM

(75) Inventor: Peter Nangle, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 09/631,871

(22) Filed: Aug. 2, 2000

(51) Int. Cl.⁷ ............................................. H04M 3/00
(52) U.S. Cl. ..................... 455/419; 455/418; 455/420
(58) Field of Search ............................... 455/418, 419, 455/420; 709/221

(56) References Cited

U.S. PATENT DOCUMENTS

| | | | | |
|---|---|---|---|---|
| 5,297,191 A | * | 3/1994 | Gerszberg | 379/59 |
| 5,381,138 A | * | 1/1995 | Stair et al. | 340/825.44 |
| 5,483,465 A | * | 1/1996 | Grube et al. | 364/516 |
| 5,553,314 A | * | 9/1996 | Grube et al. | 455/54.2 |
| 5,625,669 A | * | 4/1997 | McGregor et al. | 455/418 |
| 5,829,016 A | * | 10/1998 | Sharma et al. | 711/111 |
| 5,887,254 A | * | 3/1999 | Halonen | 455/419 |
| 6,009,524 A | * | 12/1999 | Olarig et al. | 713/200 |
| 6,029,065 A | * | 2/2000 | Shah | 455/414 |
| 6,088,730 A | * | 7/2000 | Kato et al. | 709/227 |
| 6,128,483 A | * | 10/2000 | Doiron et al. | 455/419 |
| 6,167,258 A | * | 12/2000 | Schmidt et al. | 455/419 |
| 6,233,343 B1 | * | 5/2001 | Muranami et al. | 381/96 |
| 6,238,338 B1 | * | 5/2001 | DeLuca et al. | 600/300 |
| 6,246,376 B1 | * | 6/2001 | Bork et al. | 343/760 |
| 6,279,153 B1 | * | 8/2001 | Bi et al. | 717/171 |
| 6,292,283 B1 | * | 9/2001 | Grandbois | 398/107 |
| 6,298,379 B1 | * | 10/2001 | Aguilar et al. | 709/223 |
| 6,317,827 B1 | * | 11/2001 | Cooper | 713/2 |
| 6,347,398 B1 | * | 2/2002 | Parthasarathy et al. | 717/11 |
| 6,405,027 B1 | * | 6/2002 | BelL | 455/403 |
| 6,417,781 B1 | * | 7/2002 | Matsumoto | 340/901 |
| 6,487,403 B2 | * | 11/2002 | Carroll | 455/419 |

FOREIGN PATENT DOCUMENTS

GB 2249459 A * 5/1992 ............ H04Q/7/04

* cited by examiner

Primary Examiner—William Trost
Assistant Examiner—James D Ewart
(74) Attorney, Agent, or Firm—Blakely, Sokoloff, Taylor & Zafman LLP

(57) ABSTRACT

A device, that includes nonvolatile memory, a peripheral antenna, and a peripheral radio frequency (RF) receiver, is configured to receive a peripheral RF signal containing programming and to write the programming to the nonvolatile memory. Examples of such a device include, a cellular phone, a personal digital assistant (PDA), and a desktop personal computer. The programming received by the device can be used to update a boot-up algorithm or an application stored in the nonvolatile memory of the device. In one embodiment, a system programs a plurality of devices via a plurality of peripheral RF signals particular to each device. A computer system has stored a plurality of RF data module arrays to generate the plurality of peripheral RF signals.

10 Claims, 4 Drawing Sheets

MEMORY PROGRAMMING METHOD AND SYSTEM

BACKGROUND OF THE INVENTION

1. Field of the Invention

The present invention relates generally to methods of programming non-volatile memory in a microelectronic device. More particularly, the present invention relates to the programming of devices by use of radio frequency (RF) signals. In particular, the present invention relates to a method and system for RF programming nonvolatile memory in a device.

2. Description of the Related Art

Original equipment manufacturers (OEMs) provide for memory capabilities such as nonvolatile memory in their devices. For example, most microelectronic devices contain flash memory that has, some space therein partitioned to contain programming code. During the assembly of a microelectronic device, a cable is typically connected through a port such as a serial port and the like, and programming is downloaded through the cable and into the port. Alternatively a probe may contact the circuit board of the microelectronic device and programming is downloaded in this manner.

One of the ongoing challenges with microelectronic devices is to meet customer demand for miniaturization, while retaining and preferably improving the capabilities of the device. For example, as a wireless device is contemplated for the next generations, presently referred to as generation three (G3) and generation four (G4), the need to miniaturize has placed restrictive demands upon the external data and recharging port accessibility. As the available real estate shrinks for locating the battery recharger port, the direct-current port, and the communications port, the relative footprint of these ports grows in proportion to the shrinking overall size of the device.

At least two adverse effects result from the relatively larger footprint of these ports. First, the available space for these ports becomes a greater challenge to establish. Second, the aesthetic look of the ever-miniaturizing handheld device may be compromised.

Another challenge that exists is the slow downloading times that are required to program a block of nonvolatile memory such as flash, by using prior art techniques of physically connecting and downloading to a data port, or touching the unhoused device with a downloading probe such as a bed of nails. As the density of the memory structure continues to increase and as the size of the code being lodged into the memory device continues to grow, the amount of programming time is also increasing. Consequently, as physical data link with a device only acts to increase the likelihood of a slower manufacturing times. As the demand for such devices continues to increase, a severe production bottleneck arises for programming the nonvolatile memory such as flash according to prior art methods. In relation to this challenge, there is the requirement of making a physical data link connection with each device that takes additional time, both for connection and for disconnection.

What is needed in the art is a method and system that overcomes the problems of the prior art.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. In the drawings, like structures will be provided with like reference designations. In order to show the structures of the present invention most clearly, the drawings included herein are diagrammatic representations of integrated circuit structures. Thus, the actual appearance of the fabricated structures, for example in a photograph, may appear different while still incorporating the essential structures of the present invention. Moreover, the drawings show only the structures necessary to understand the present invention. Additional structures known in the art have not been included to maintain the clarity of the drawings. Understanding that these drawings depict only typical embodiments of the invention that are not necessarily drawn to scale and are not therefore to be considered to be limiting of its scope, the invention will be described and explained with additional specificity and detail through the use of the accompanying drawings in which.

DETAILED DESCRIPTION OF THE INVENTION

The present invention relates to RF programming of a device that contains non-volatile memory for example. One embodiment of the present invention relates to RF programming of a device such as a desktop, laptop, hand-held, or a wireless device by using a peripheral receiver. A peripheral receiver may comprise technology such as the Bluetooth standard and the like. Presently, the peripheral receiver may have a peripheral antenna or the peripheral receiver may use another antenna.

The following description includes terms, such as upper, lower, first, second, etc. which are used for descriptive purposes only and are not to be construed as limiting. The embodiments of an apparatus or article of the present invention described herein can be manufactured, used, or shipped in a number of positions and orientations.

Reference will now be made to the drawings wherein like structures will be provided with like reference designations. In order to show the structures of the present invention most clearly, the drawings included herein are diagrammatic representations of integrated circuit structures. Thus, the actual appearance of the fabricated structures, for example in a schematic overview, may appear different while still incorporating the essential structures of the present invention. Moreover, the drawings show only the structures necessary to understand the present invention. Additional structures known in the art have not been included to maintain the clarity of the drawings.

Figure 1:
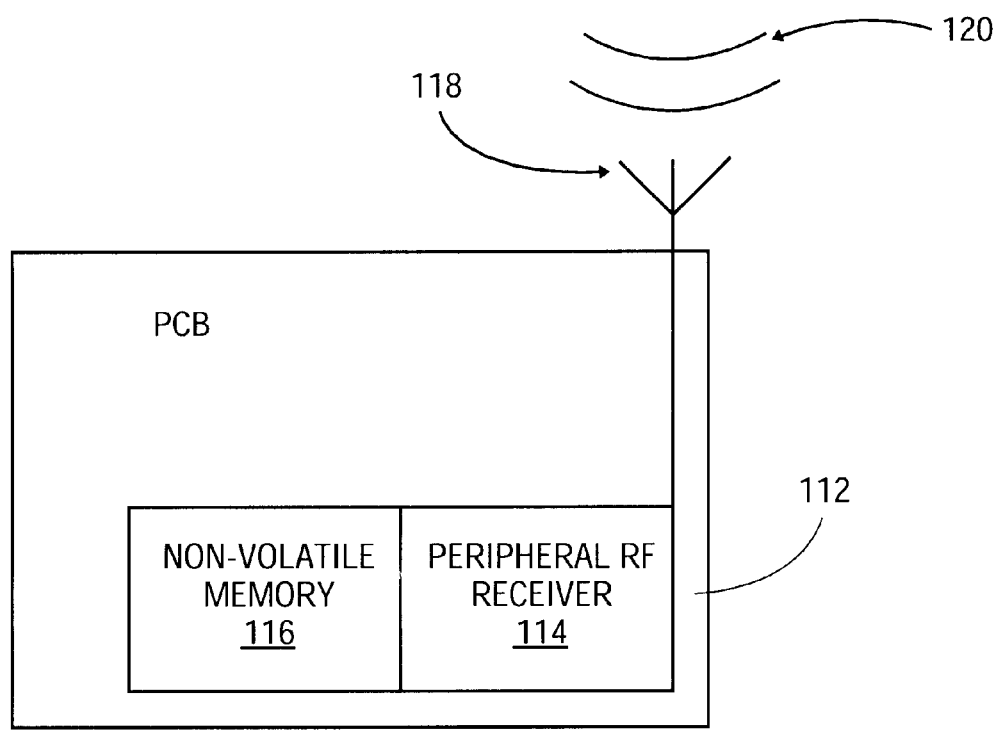
FIG. 1 is a schematic view of a device that includes a peripheral antenna and an RF circuit.

The present invention relates to a method of RF programming a device. The device is programmed through a peripheral radio frequency receiver such as a Bluetooth standard receiver. The inventive method comprises providing a device comprising a nonvolatile memory and a peripheral radio frequency receiver. FIG. 1 is an illustration of a device 110 that uses the inventive method and system. Device 110 may include a printed circuit board (PCB) 112, a peripheral RF receiver 114 such as a Bluetooth standard circuit, and a nonvolatile memory 116. The memory can be nonvolatile. Preferably, the memory is a nonvolatile erasable programmable read-only memory (EPROM). More preferably, the nonvolatile memory is electronically erasable programmable read-only memory (EEPROM or $E^2$PROM). Most preferably, the nonvolatile memory is flash.

Peripheral RF receiver 114 may use a peripheral antenna 118 for the inventive method. A peripheral RF signal 120 is generated from a programming source (not depicted) that contains programming to be retained in nonvolatile memory 116. Another portion of the inventive method includes receiving peripheral RF signal 120 at peripheral RF receiver 114, and followed by programming device 110 by transferring data contained in peripheral RF signal 120, from peripheral RF receiver 114, into nonvolatile memory 116.

One embodiment of the above method is wherein the nonvolatile memory is flash memory. In an embodiment wherein peripheral RF receiver 114 operates at or around the Bluetooth standard frequency, peripheral RF receiver 114 operates at a data transfer rate in a range from about 700 KBps (Kilo Bits per second) to about 740 KBps, preferably about 721 KBps. Although the Bluetooth standard with RF receiver 114 is one example of a means for programming a nonvolatile memory consisting essentially of a peripheral radio frequency connection, other RF schemes may be used as RF receiver 114.

Because the inventive method is not restricted to programming handheld or wireless devices, one embodiment of the present invention relates to a device such as a desktop personal computer (PC) that includes a flash memory comprising a basic input/output system (BIOS). Where the desktop PC has a peripheral RF capability, the BIOS may be programmed according to the present invention.

Figure 2:
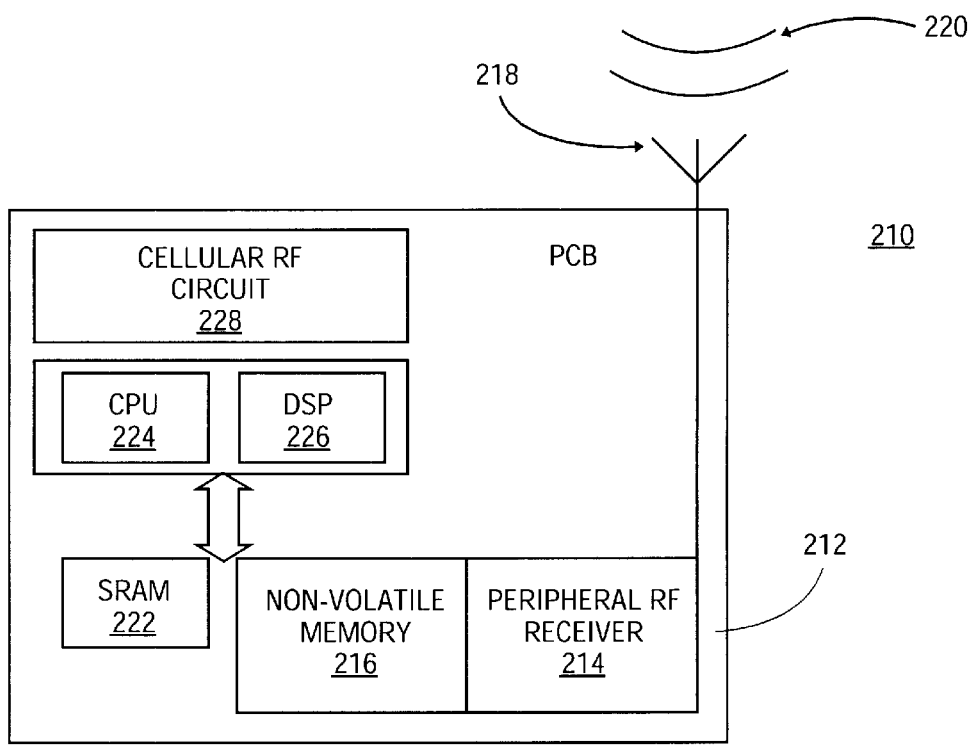
FIG. 2 is a schematic view of a hand-held device that includes a peripheral antenna and an RF circuit.

According to another embodiment of the present invention, the inventive method may include the additional element wherein the device comprises a hand-held wireless device 210 such at that illustrated in FIG. 2. A wireless device 210 may include a PCB 212, and a peripheral RF receiver 214, and a non-volatile memory 216 such as flash. Device 210 is itself a peripheral device, or communicates to a peripheral device such as a PC, a PDA, a printer, and the like through a peripheral RF antenna 218. Additionally, where device 210 is wireless such as a cell phone, other functionalities such as an static random access memory 222, a central processor 224, a digital signal processor 226, and a cellular RF circuit 228 are provided.

Figure 3:
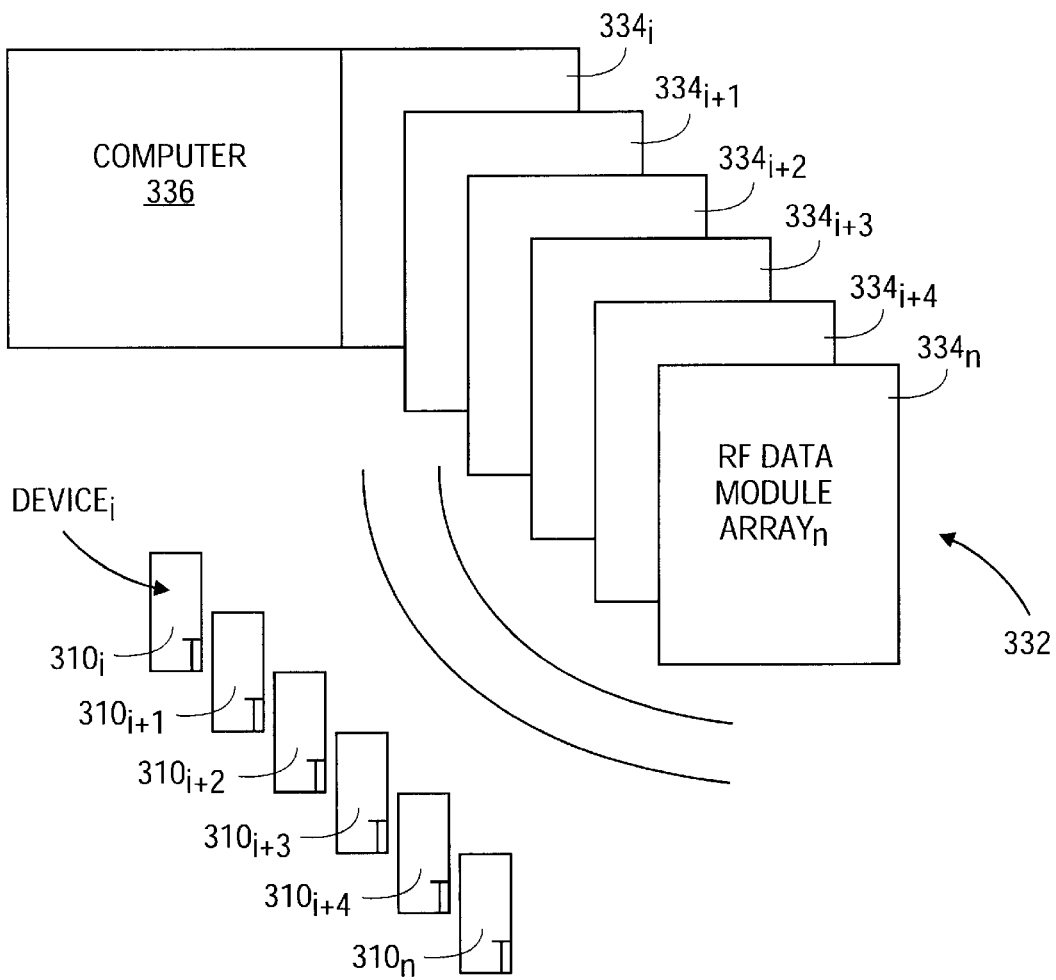
FIG. 3 is a schematic view of a gang programming system according to the present invention.

In the inventive method, a programming system 330 is configured in an array of at least two devices to be programmed as illustrated in FIG. 3. A server 332 is provided, wherein the server comprises an RF data module array 334 that is configurable for peripheral RF communication with the at least two devices to be programmed. Data module array 334 is connected to a computer 336 such as a PC or the like, or to a dedicated system. In any event, computer 336 comprises a digital processor. Each data module $334_i$–$334_n$ is connected to computer 336. Data module array 334 and is capable of programming up to n devices $310_i$–$310_n$. Typical with Bluetooth standard technology where several peripheral devices are being used by several users in close proximity, data module array 334 communicates separately and singly to each device $310_i$–$310_n$.

The inventive method also may include an additional method element that a supply voltage is provided from either an alternating current (AC) source or a direct current (DC) source. Where the device is contemplated to be a desktop system such as a desktop PC, the supply voltage will likely be from an AC source. On the other hand, where the device is contemplated to be principally battery operated such as a laptop computer, a notebook computer, a hand-held computer, a PDA, a cell phone, or the like, the supply voltage can be either from an AC source or a DC source such as the permanent battery that may accompany a cordless device. Although the supply voltage as set forth herein is one example of a physical connection means selected from the group consisting of a battery recharger means and external power supply means, other physical power supply connections may be used.

Various methods may be carried out according to the present invention. In one embodiment, programming the device comprises overwriting at least one datum in the nonvolatile memory by downloading programming code through the peripheral RF receiver. Accordingly, some or all of a first software version may be eliminated or updated by the inventive method. In another embodiment, the first software version is preprogrammed or simply is not overwritten, and additional programming is written to nonvolatile memory by downloading programming code through the peripheral RF receiver as an enhancement or a replacement to the first software version. According to this embodiment, programming the device may further comprise updating a first software version in the nonvolatile memory array by downloading programming code through the peripheral RF receiver, with a second software version. Although the term "version" is used, it is understood that first programming may have a different function than second programming such as preprogramming and OEM programming, respectively.

It may be understood by this embodiment, that the inventive method may comprise overwriting at least one datum in the nonvolatile memory and updating a first software version in the nonvolatile memory array with a second software version by downloading programming code through the peripheral RF receiver.

Because the software versions may be proprietary code that may be specific to an OEM, programming the device according to the inventive method may require providing radio emission shielding to hinder transmission of the peripheral radio frequency signal beyond the device or at least beyond the confines of the OEM facility. Typically, because RF signals of the Bluetooth standard and the like are designed for peripheral device communication distances such as a few meters at most, providing radio emission shielding to hinder transmission of the peripheral radio frequency signal beyond the device may not be required. In any event, the present invention provides for such radio emission shielding.

The device may include a first level of programming before it is shipped to an OEM. This first level of programming may comprise a boot-up algorithm that allow the device to turn on and receive additional programming such as the first software version or the second software version as set forth herein. A second level of programming may be programmed into the nonvolatile memory such as a device application algorithm. Where the device is a desktop and/or non-wireless device, the device application algorithm programs the device to perform within the specific parameter of a given OEM according to the qualities that are being manufactured into the device. For example, the basic input/output system (BIOS) of a computer or other device may be programmed into nonvolatile memory according to the inventive method. By way of another non-limiting example, where the device is a hand-held and/or wireless device, programming the device may comprise programming a second level of programming comprising a device application algorithm such as a BIOS wherein the device application is hand-held and/or wireless.

In another embodiment of the present invention, a system is provided for updating previous programming by gang programming a plurality of previously programmed devices. In this embodiment, an array of devices to be programmed is provided. At least one of the devices to be programmed comprises a nonvolatile memory and a peripheral radio frequency receiver. The inventive system also includes a server, wherein the server comprises an RF data module array that is configurable for peripheral RF communication with the array of devices to be programmed similar to what is illustrated in FIG. 3. Accordingly, the present invention may be used as a retrofit or entirely new programming of existing devices.

By review or practice of the present as set forth herein, it will be clear to one of ordinary skill in the art that the inventive method of designing a wireless device system may comprise obtaining an existing wireless device design. Typically, the wireless device design comprises a physical connection interface for downloading operating code into a nonvolatile memory. According to the inventive method, the physical connection interface is removed from the design. In its place, a peripheral radio frequency receiver is used to receive downloaded programming. Accordingly, the physical connection interface is displaced with a link between the nonvolatile memory and the peripheral radio frequency receiver. According to this embodiment, programming the wireless device is done by generating a radio frequency signal and receiving the radio frequency signal by peripheral RF receiver 214. Peripheral antenna 218 or another antenna such as an integrated antenna (not pictured) may be used to capture peripheral RF signal 220.

Another embodiment of the present invention relates to a wireless implementation of the inventive method. The method includes providing a wireless device 210 comprising a nonvolatile memory 216, a first programming disposed in nonvolatile memory 216, and a peripheral antenna 218 as illustrated in FIG. 2. According to the embodiment, the inventive method further includes transmitting second programming to wireless device 210, wherein the second programming is received at peripheral antenna 218. Finally, the inventive method comprises updating the first programming by fixing the second programming in nonvolatile memory 216. Alternatively, the second programming is received at peripheral receiver Where a programming update may be required, the inventive method includes writing code and/or data into nonvolatile memory 216 that overwrites at least a part of the first programming. A preferred embodiment of the inventive method uses flash memory for nonvolatile memory 216. Additionally, the first programming may comprises a previous version of wireless device programming. This situation may occur typically where a group of devices have been programmed with a first programming near the shipping time of an update or replacement second programming. Where the devices have not been shipped, the inventive method may be employed to update or replace existing first programming with more current second programming. Alternatively, the first programming comprises programming that prepares the wireless device to receive memory array configuration second programming. Accordingly, the method may comprise first programming that prepares the wireless device to receive memory array configuration programming, and the second programming may comprise programming from an OEM that enables the wireless device to function in a manner that is peculiar to the OEM product.

Another embodiment of the invention relates to reprogramming previously used and/or sold and used wireless devices that may have been turned in for various reasons such as a trade-in transaction for a newer device. It could be for repair of a device or it could be to have a new feature added to an existing device. In this embodiment, programming system 330 has capabilities of a handshake or the like with a plurality of devices that may not be of the same manufacture and/or programming. Accordingly, server 332 determines the individual characteristics of a plurality of wireless devices $310_i$–$310_n$. Subsequently, new programming is downloaded through the peripheral RF interface that may be specific to each device in the plurality of wireless devices. The new programming may upgrade the plurality of devices for reuse with newer technology.

Another embodiment comprises a data interface for programming nonvolatile memory, wherein the data interface for programming nonvolatile memory is a radio frequency connection. The physical interface has a connector that consists of a battery recharger and/or an external power supply connector. There is no physical connector for data transmission. The data interface for programming may consist of a peripheral antenna such as a Bluetooth standard antenna. In an alternative of this embodiment, there is no physical interface for either power supply or for a data link. According to this embodiment, the device may have rechargeable or disposable batteries.

Figure 4:
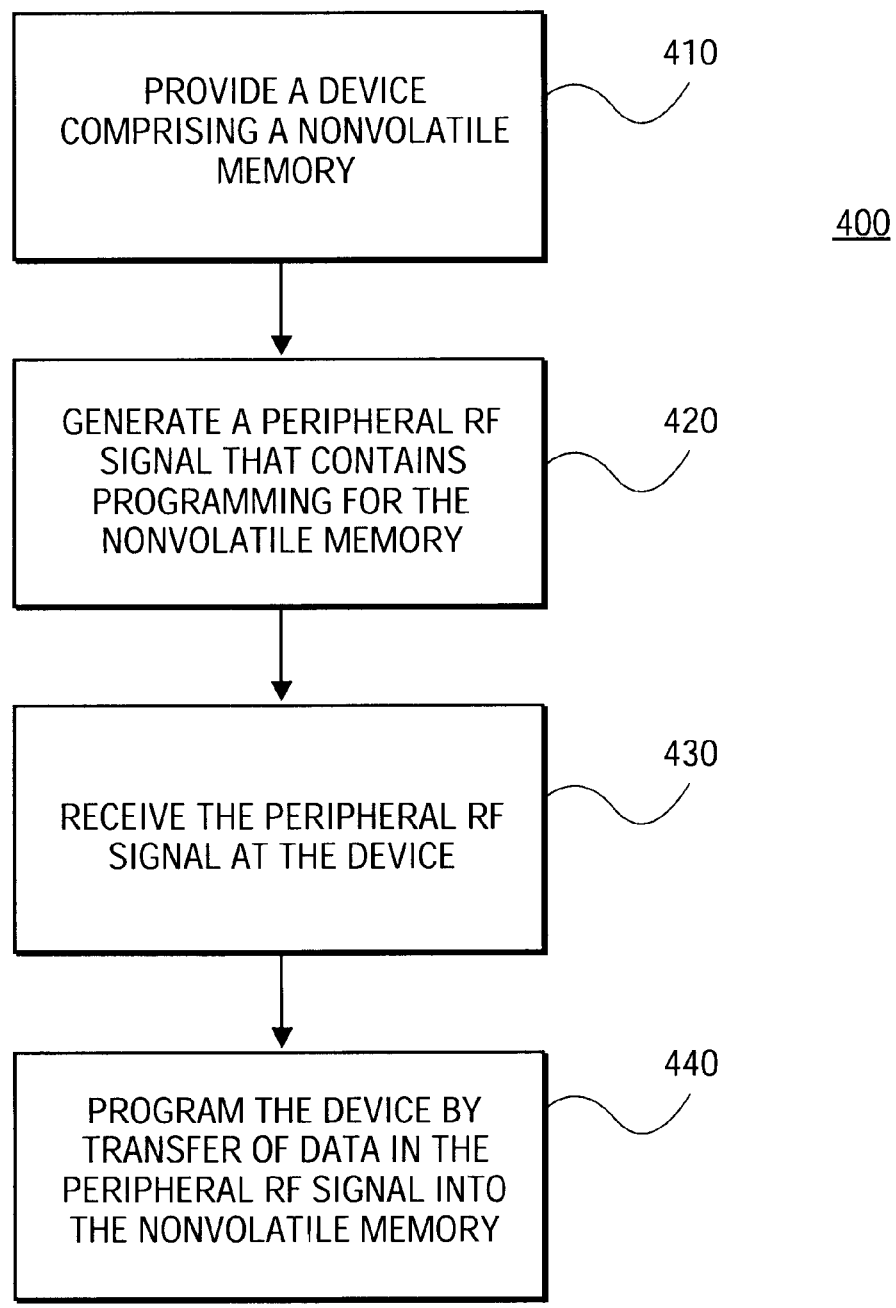
FIG. 4 is a process flow block diagram of the inventive method.

FIG. 4 is a method flow chart block diagram that illustrates the inventive method of the present invention. The method 400 includes a method of programming a device comprising providing a device 410 comprising a nonvolatile memory and a peripheral radio frequency receiver. At method block 420, a peripheral radio frequency signal is generated. At method block 430, the peripheral radio frequency signal is received with the peripheral radio frequency receiver. At method block 440, the device is programmed by transferring data contained in the peripheral radio frequency signal through the peripheral radio frequency receiver, into the nonvolatile memory.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method, comprising:
   determining individual characteristics of a plurality of computing devices;
   transmitting a plurality of peripheral radio frequency (RF) signals based on the individual characteristics of each of the plurality of computing devices, wherein each peripheral RF signal contains proprietary original equipment manufacturer ("OEM") code particular to each of the plurality of computing devices;
   receiving the plurality of peripheral RF signals by the plurality of computing devices, wherein each computing device comprising:
   a peripheral antenna to receive a corresponding one of the plurality of peripheral RF signals;
   a peripheral RF receiver coupled to the peripheral antenna;
   a nonvolatile memory coupled to the peripheral RF receiver in which a first programming is stored, the first programming to enable each computing device to turn on and to receive the proprietary OEM code particular to each computing device; and a central processing unit ("CPU") to execute the first programming and to execute the received proprietary OEM code; and writing the proprietary OEM code particular to each computing device received via the peripheral antenna of each computing device into the nonvolatile memory of each computing device.

2. The method of claim 1, wherein the nonvolatile memory of each computing device is a flash memory device.

3. The method of claim 1, wherein the plurality of peripheral RF signals operate at a data transfer rate of at least 700 KBps.

4. The method of claim 1, wherein each computing device comprises one of a desktop computer, a laptop computer, and a notebook computer.

5. The method of claim 1, wherein the computing device is a handheld wireless computing device, further comprising:

a static random access memory coupled to the nonvolatile memory;

a digital signal processor coupled to the central processing unit; and a cellular radio frequency circuit coupled to the digital signal processor.

6. The method of claim 1, wherein the proprietary OEM code particular to each computing device is generated from a RF data module array particular to each computing device, the RF data module arrays stored on a computer system.

7. The method of claim 1, wherein writing the proprietary OEM code particular to each computing device into the nonvolatile memory of the respective computing device comprises updating the first programming with the proprietary OEM code.

8. The method of claim 7, wherein the first programming comprise a boot-up algorithm.

9. The method of claim 7, wherein updating the first programming with the proprietary OEM code comprises overwriting at least one datum of the first programming.

10. The method of claim 1, wherein receiving a plurality of peripheral RF signals to occur in a facility having radio emission shielding.

* * * * *